United States Patent
Endo et al.

(10) Patent No.: US 9,975,386 B2
(45) Date of Patent: May 22, 2018

(54) TIRE/WHEEL ASSEMBLY AND TREAD RING

(71) Applicant: The Yokohama Rubber Co., LTD., Minato-ku, Tokyo (JP)

(72) Inventors: Kenichiro Endo, Hiratsuka (JP); Jun Matsuda, Hiratsuka (JP); Yoshiaki Hashimura, Hiratsuka (JP); Izumi Kuramochi, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 189 days.

(21) Appl. No.: 14/655,681

(22) PCT Filed: Dec. 18, 2013

(86) PCT No.: PCT/JP2013/083942
§ 371 (c)(1),
(2) Date: Jun. 25, 2015

(87) PCT Pub. No.: WO2014/103841
PCT Pub. Date: Jul. 3, 2014

(65) Prior Publication Data
US 2015/0343856 A1    Dec. 3, 2015

(30) Foreign Application Priority Data
Dec. 25, 2012 (JP) .................................. 2012-281383

(51) Int. Cl.
*B60C 3/00* (2006.01)
*B60C 5/00* (2006.01)
(Continued)

(52) U.S. Cl.
CPC .............. *B60C 19/125* (2013.01); *B60C 5/01* (2013.01); *B60C 5/04* (2013.01); *B60C 5/18* (2013.01);
(Continued)

(58) Field of Classification Search
CPC .... B60C 3/00; B60C 5/01; B60C 5/02; B60C 11/12
See application file for complete search history.

(56) References Cited

U.S. PATENT DOCUMENTS 1,392,853 A * 10/1921 Ryder ..................... B60O 5/24
                                                         152/338.1
3,848,651 A    11/1974 French
(Continued)

FOREIGN PATENT DOCUMENTS

| CN | 1315264 | 10/2001 |
|----|---------|---------|
| CN | 201283754 | 8/2009 |

(Continued)

OTHER PUBLICATIONS

International Search Report for International Application No. PCT/JP2013/083942 dated Apr. 8, 2014, 4 pages, Japan.

*Primary Examiner* — Justin R Fischer
(74) *Attorney, Agent, or Firm* — Thorpe North & Western

(57) ABSTRACT

A tire-wheel assembly comprises a wheel coupled to a rotating shaft; an elastic tube disposed on an outer side of the wheel with respect to a radial direction, the interior of the tube being filled with air; a rigid protective ring disposed on an outer side of the tube with respect to the radial direction separated from the wheel; and a tread ring disposed on an outer side of the protective ring with respect to the radial direction, an inner circumferential surface of the tread ring contacting an outer circumferential surface of the protective ring.

20 Claims, 16 Drawing Sheets

(51) Int. Cl.
  *B60C 5/01* (2006.01)
  *B60C 5/02* (2006.01)
  *B60C 19/12* (2006.01)
  *B60C 11/03* (2006.01)
  *B60C 11/02* (2006.01)
  *B60C 5/24* (2006.01)
  *B60C 15/02* (2006.01)
  *B60C 15/036* (2006.01)
  *B60C 5/04* (2006.01)
  *B60C 5/22* (2006.01)
  *B60C 11/00* (2006.01)
  *B60C 5/18* (2006.01)
  *B60C 5/20* (2006.01)

(52) U.S. Cl.
  CPC .................. *B60C 5/20* (2013.01); *B60C 5/22* (2013.01); *B60C 5/24* (2013.01); *B60C 11/00* (2013.01); *B60C 11/02* (2013.01); *B60C 11/032* (2013.01); *B60C 11/0323* (2013.01); *B60C 15/0233* (2013.01); *B60C 15/036* (2013.01)

(56) References Cited

U.S. PATENT DOCUMENTS

| | | | |
|---|---|---|---|
| 6,343,635 | B1 | 2/2002 | Hsu |
| 7,913,733 | B2 * | 3/2011 | Abdallah ................ B60B 19/00 152/159 |
| 2010/0263777 | A1 | 10/2010 | Sakai et al. |
| 2010/0319828 | A1 | 12/2010 | Deal |
| 2011/0030863 | A1 | 2/2011 | Radulescu |
| 2011/0132513 | A1 | 6/2011 | Bestgen et al. |

FOREIGN PATENT DOCUMENTS

| | | | |
|---|---|---|---|
| DE | 36 12 881 | | 11/1986 |
| EP | 1958795 | * | 8/2008 |
| GB | 190604921 | * | 2/1907 |
| GB | 1491438 | * | 11/1977 |
| JP | S48-037801 | | 6/1973 |
| JP | 2-34406 | * | 2/1990 |
| JP | 2001-121930 | | 5/2001 |
| JP | 2005-132123 | | 5/2005 |
| JP | 2005-280021 | * | 10/2005 |
| JP | 2007-320044 | * | 12/2007 |
| JP | 2010-137648 | | 6/2010 |
| JP | 2010-173614 | * | 8/2010 |
| JP | 2011-500414 | | 1/2011 |
| JP | 2011-514288 | | 5/2011 |
| JP | 2011-521847 | | 7/2011 |
| JP | 2011-168250 | | 9/2011 |
| WO | WO 2000/00357 | | 1/2000 |
| WO | WO 2009/084660 | | 7/2009 |
| WO | WO 2009/087291 | | 7/2009 |
| WO | WO 2009-116987 | | 9/2009 |
| WO | WO 2009/147236 | | 12/2009 |
| WO | WO 2012/026547 | | 3/2012 |

* cited by examiner

TIRE/WHEEL ASSEMBLY AND TREAD RING

TECHNICAL FIELD

The present technology relates to a tire-wheel assembly combining a tire and a wheel, and to a tread ring.

BACKGROUND

Pneumatic tires are known as tires widely used for automobiles and other vehicles in general. A pneumatic tire is mounted on a wheel, and the space between the wheel and the pneumatic tire is filled with air. Pneumatic tires are subject to the problem of loss of the gas filling their interiors, such as air or nitrogen, due to punctures and the like. Tire-wheel assemblies with novel configurations have been considered in recent years. For example, non-pneumatic tires with interiors not filled with gas, such as disclosed in Japanese Unexamined Patent Application Publication No. 2011-500414, have been considered.

Non-pneumatic tires with interiors not filled with air as disclosed in Japanese Unexamined Patent Application Publication No. 2011-500414 present problems such as being labor-intensive to manufacture and posing difficulty in striking a balance between tire deformation and strength.

PRIOR ART DOCUMENT

Patent Document

Patent Document 1: Japanese Unexamined Patent Application Publication (translation of PCT application) No. 2011-500414

Patent Document 2: Japanese Unexamined Patent Application Publication No. S55-8361A Patent Document 3: Japanese Unexamined Patent Application Publication (translation of PCT application) No. 2011-514288

SUMMARY

The present technology provides a novel tire-wheel assembly and tread ring.

A tire-wheel assembly according to the present technology includes a wheel coupled to a rotating shaft; an elastic tube disposed on an outer side of the wheel with respect to a radial direction, the interior of the tube being filled with air; a rigid protective ring disposed on an outer side of the tube with respect to the radial direction so as to be separated from the wheel; and a tread ring disposed on an outer side of the protective ring with respect to the radial direction, an inner circumferential surface of the tread ring contacting an outer circumferential surface of the protective ring.

Through-holes that penetrate from the inner circumferential surface to the outer circumferential surface are preferably formed in the tread ring.

It is preferable that inner circumferential surface grooves that are concave with respect to the outer circumferential surface be formed in the inner circumferential surface of the tread ring, the inner circumferential surface grooves being connected with the through-holes.

It is preferable that the inner circumferential surface of the protective ring decreases in diameter progressing outward in a width direction that is parallel to the rotating shaft.

It is preferable that the outer circumferential surface of the wheel increases in diameter progressing outward in the width direction that is parallel to the rotating shaft.

The tube is preferably provided with a plurality of projections for improving adhesion with the protective ring on the outer circumferential surface of the tube.

The tube is preferably provided with a shape-regulating structure that regulates deformation in the width direction of the tire.

The tube preferably includes a plurality of divided tube divisions.

The tube divisions are preferably disposed adjacent to one another in a circumferential direction concurrent with the rotational direction of the rotating shaft.

The tube divisions are preferably disposed adjacent to one another in the width direction.

The tube is preferably provided with a dividing wall that divides air-filled interior spaces in the tube.

A check valve that connects adjacent interior spaces and allows for unidirectional air flow is preferably provided in the dividing wall of the tube.

The tread ring is preferably removable from the protective ring.

An inner circumferential surface of the tube preferably contacts the outer circumferential surface of the wheel.

It is preferable that an inner circumference supporting section that contacts the wheel and the tube and holds the tube against the wheel be further provided.

The outer circumferential surface of the tube preferably contacts the inner circumferential surface of the protective ring.

It is preferable that an outer circumference supporting section that contacts the protective ring and the tube and holds the tube against the protective ring be further provided.

A tread ring according to the present technology is an annular tread ring that is formed from an elastic member, and includes an inner circumferential surface that contacts a ring-shaped rigid member and an outer circumferential surface that contacts the ground, the tread ring including through-holes formed in the tread ring that penetrate from the inner circumferential surface to the outer circumferential surface. The ring-shaped rigid member referred to here is equivalent to the protective ring of the present embodiment.

It is preferable that inner circumferential surface grooves that are concave with respect to the outer circumferential surface be formed in the inner circumferential surface, the inner circumferential surface grooves being connected with the through-holes.

The inner circumferential surface grooves preferably extend from one end to another in a width direction of the inner circumferential surface that is parallel to a central axis.

It is preferable that outer circumferential surface grooves that are concave with respect to the inner circumferential surface be formed in the outer circumferential surface, the outer circumferential surface grooves being connected to the inner circumferential surface grooves.

The tire-wheel assembly and tread ring according to the present technology are capable of absorbing shocks imparted to the vehicle body from the road surface when driving by virtue of the tube. Because the tube can be protected by the protective ring, tire punctures can be suppressed. By virtue of the tread ring being supported by the protective ring, deformation of the tread ring can be suppressed, and driving performance can be improved.

DETAILED DESCRIPTION

Forms (embodiments) of the present technology are described below in detail with reference to the drawings. However, the present technology is not limited to that described in the following embodiments. Additionally, the components described below encompass those components that could be easily conceived by a person skilled in the art, and components that are essentially identical to those described herein. Furthermore, it is possible to combine the components described below as desired.

First Embodiment

Figure 1:
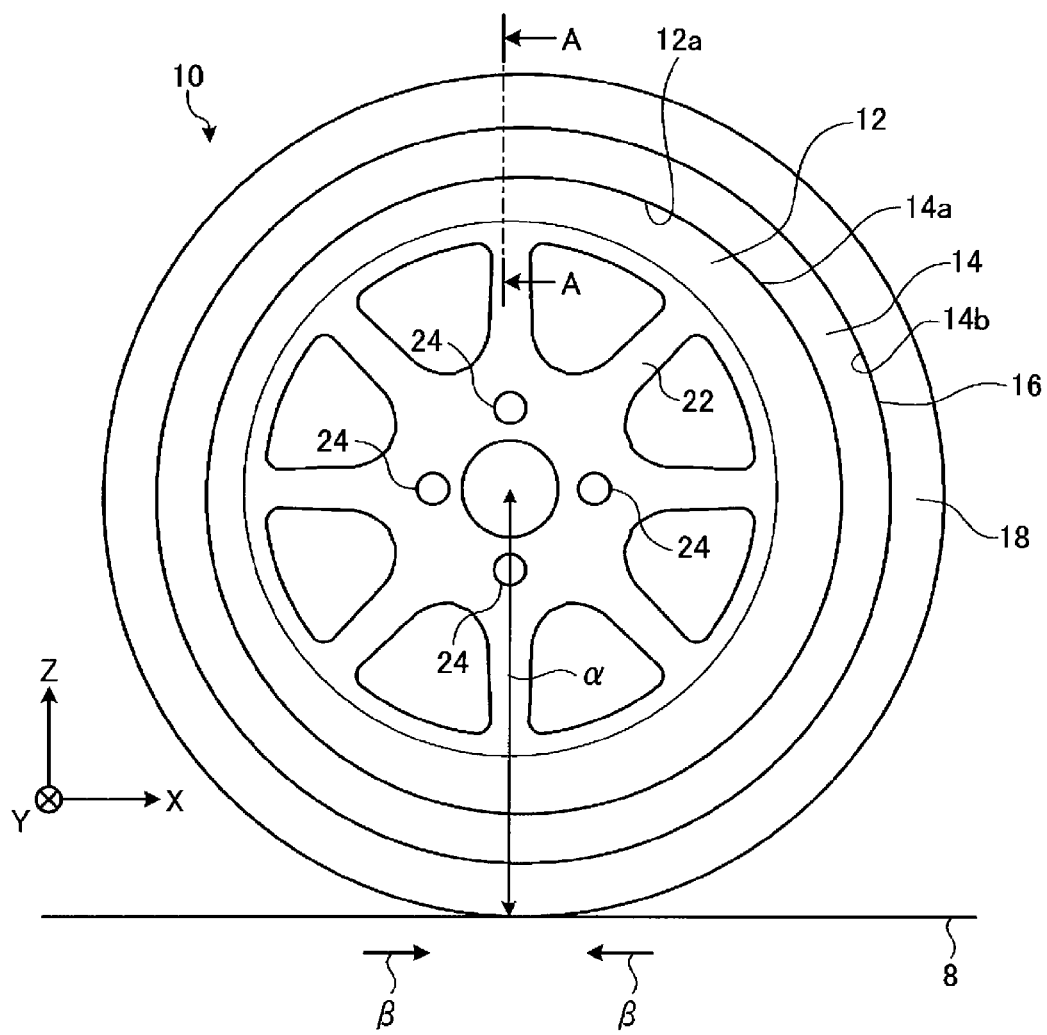
FIG. 1 is a side view of the schematic configuration of an example of a tire-wheel assembly according to the present embodiment.
Figure 2:
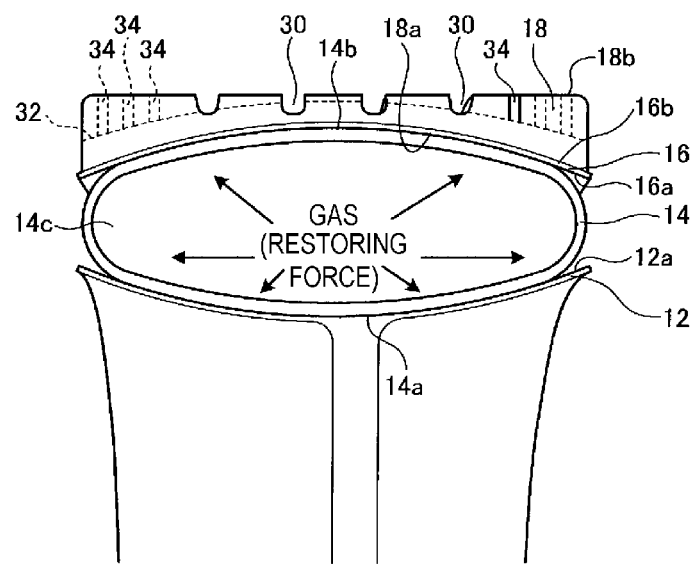
FIG. 2 is a cross-sectional view along line A-A in FIG. 1.
Figure 3:
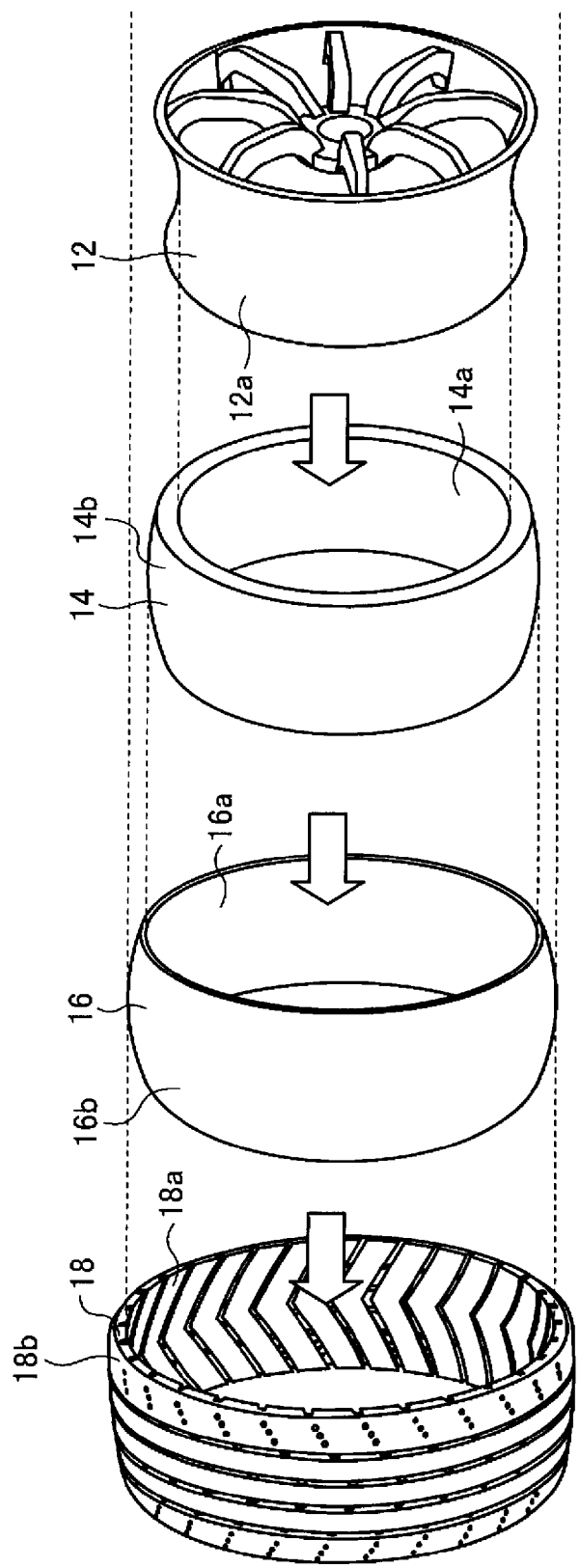
FIG. 3 is an exploded perspective view of the tire-wheel assembly illustrated in FIG. 1.

FIG. 1 is a side view of the schematic configuration of an example of a tire-wheel assembly according to the present embodiment. FIG. 2 is a cross-sectional view along line A-A in FIG. 1. FIG. 3 is an exploded perspective view of the tire-wheel assembly illustrated in FIG. 1. The cross-sectional view along line A-A is a meridian line cross-sectional view of the tire-wheel assembly. A meridian line cross section is a plane that is parallel to the rotating shaft of the tire-wheel assembly 10 and contains the rotating shaft, the cross section being yielded by cutting the tire-wheel assembly 10. In the meridian cross section, the tire-wheel assembly 10 exhibits axial symmetry with respect to the rotating shaft; thus, in the present embodiment, one symmetrical half will be illustrated in the drawings.

The tire-wheel assembly 10 rotates about the central axis (Y axis). The Y axis is both the central axis and the rotating shaft of the tire-wheel assembly 10. The axis orthogonal to the central axis (rotating shaft) Y axis of the tire-wheel assembly 10 and parallel to the road surface contacted by the tire is the X axis, and the axis orthogonal to the Y and X axes is the Z axis. The direction parallel to the Y axis is the width direction of the tire-wheel assembly 10. The direction passing through the Y axis and orthogonal to the Y axis is the radial direction of the tire-wheel assembly 10. The circumferential direction centered on the Y axis is the circumferential direction of the tire-wheel assembly 10. A tire equatorial plane RP is a plane that is orthogonal to the rotating shaft (Y axis) of the tire-wheel assembly 10 and passes through the center of the width direction of the tire-wheel assembly 10. A tire equator line is a line upon the tire equatorial plane along which the outer circumferential surface of the tire-wheel assembly 10 and the equatorial plane intersect. A section of the tire-wheel assembly 10 contacts a road surface 8 in the lower middle part of FIG. 1. The section of the tire-wheel assembly 10 contacting the road surface 8 is the ground contact patch (ground contact surface). The tire-wheel assembly 10 of the present embodiment can be mounted to various types of vehicles, such as passenger vehicles, buses, and trucks.

The tire-wheel assembly 10 illustrated in FIGS. 1 to 3 comprises a wheel 12, a tube 14, a protective ring 16, and a tread ring 18. The wheel 12, tube 14, protective ring 16, and tread ring 18 of the tire-wheel assembly 10 are disposed in that order proceeding outward in the radial direction from the rotating shaft. An outer circumferential surface 12a of the wheel 12 contacts an inner circumferential surface 14a of the tube 14. The inner circumferential surface 14a of the tube 14 contacts the outer circumferential surface 12a of the wheel 12, as described above, and an outer circumferential surface 14b thereof contacts an inner circumferential surface 16a of the protective ring 16. The inner circumferential surface 16a of the protective ring 16 contacts the outer circumferential surface 14b of the tube 14, and an outer circumferential surface 16b thereof contacts an inner circumferential surface 18a of the tread ring 18. The inner circumferential surface 18a of the tread ring 18 contacts the outer circumferential surface 16b of the protective ring 16, and an outer circumferential surface 18b thereof is a ground contact surface that contacts the ground. The central axis of the wheel 12, the tube 14, the protective ring 16, and the tread ring 18 is shared with the rotating shaft (Y axis) of the tire-wheel assembly 10. The tube 14, protective ring 16, and tread ring 18 of the tire-wheel assembly 10 are equivalent to the tire of the tire-wheel assembly 10.

The wheel 12 is a member coupled to a rotating shaft (axle) of a vehicle. The wheel 12 of the present embodiment has a plurality of spokes 22 linked to a hub, the hub being coupled to the rotating shaft. The spokes 22 are disposed radiating from inside to outside in the radial direction. The hub is provided with bolt holes 24 for inserting fastening members (such as bolts) for fastening the wheel 12 to the rotating shaft. A ring-shaped (cylindrical) member is coupled to the radial outer ends of the spokes 22 of the wheel 12. The diameter of the outer circumferential surface 12a of the wheel 12 increases progressing outward (i.e., toward the ends) in the width direction (width direction of the tire, Y-axis direction). Specifically, the outer circumferential surface 12a has a cross section shaped like a curve (in the present embodiment, an arc) that bulges inward in the radial direction, and has its smallest diameter in the center with respect to the width direction. The shape of the wheel 12 is not limited to one provided with spokes 22. The wheel 12 may also be disc-shaped. The wheel 12 is preferably manufactured in the shape applied in the present embodiment, but a wheel typically used for pneumatic tires may also be used. The wheel 12 may be provided with a specialized fixture serving as a contact surface between the rim (outside) of a typical wheel and the tube 14. In other words, the wheel may be constituted by a combination of a typical wheel and a specialized fixture.

In the present embodiment, the wheel 12 is made of metal, but is not limited thereto. For example, the wheel 12 may be made of a fiber reinforced plastic such as carbon fiber reinforced plastic (CFRP) or glass fiber reinforced plastic (GFRP). In the present embodiment, the wheel 12 is made of an aluminum alloy. The metal material is not limited to being an aluminum alloy; for example, steel (such as carbon steel, stainless steel, or the like) is also acceptable. Aluminum alloy has a lower specific gravity than steel, and is therefore preferable as it allows the mass of the tire-wheel assembly 10 to be reduced.

The tube 14 is interposed between the wheel 12 and the protective ring 16, and extends in the circumferential direction of the wheel 12 and the protective ring 16. The tube 14 is an endless tube that circles around the outer circumference of the wheel 12 and the inner circumference of the protective ring 16. An interior space 14c of the tube 14 is filled to a predetermined pressure with a gas (such as air, nitrogen, or a mixture thereof). The tube 14 is a member for producing repulsive force in response to compression. In the present embodiment, the tube 14 is an elastic member that expands, contracts, and deforms, and is made, for example, from rubber or a flexible resin. When the tube 14 is made of rubber, a rubber material similar to that used for the tread ring 18 described above, for example, can be used. The functions of the tube 14 will be described hereafter.

The protective ring 16 is a cylindrical member disposed on an outer side of the tube 14 in the radial direction. The innermost part of the protective ring 16 with respect to the radial direction is position further outside than the outermost part of the wheel 12. As a result, the protective ring 16 is disposed at a predetermined distance from the wheel 12. The diameter of the inner circumferential surface 16a of the protective ring 16 decreases progressing outward (i.e., toward the ends) in the width direction (width direction of the tire, Y-axis direction). As a result, the region surrounded by the outer circumferential surface 12a of the wheel 12 and the inner circumferential surface 16a of the protective ring 16 becomes progressively narrower with respect to the radial direction moving outward in the width direction, as illustrated in FIG. 2.

In the present embodiment, the protective ring 16, like the wheel 12, is made of metal, but is not limited thereto. For example, the protective ring 16 may be made of a fiber reinforced plastic such as carbon fiber reinforced plastic (CFRP) or glass fiber reinforced plastic (GFRP). In the present embodiment, the protective ring 16 is made of an aluminum alloy, but is not limited thereto. The reasons for this are similar to those of the wheel 12.

The inner circumferential surface 18a of the tread ring 18 contacts the outer circumferential surface 16b of the protective ring 16. The tread ring 18 is equivalent to the tread portion of the tire of the tire-wheel assembly 10. The tread ring 18 covers the outer circumferential surface 16b of the annular protective ring 16 one full turn in the circumferential direction. In other words, the tread ring 18 is a rubber ring fit over the outer circumferential surface 16b of the protective ring 16. A number of different types of rubber may be layered in the radial direction to form the tread ring 18. Because the tread ring 18 is made of rubber, the protective ring 16 and tread ring 18 equivalent to the tire of the tire-wheel assembly 10 are equivalent to a non-pneumatic tire.

In the present embodiment, the dimensions of the tread ring 18 with respect to the width direction are substantially identical to the dimensions of the protective ring 16 with respect to the width direction, but the former are preferably equal to or less than the latter. Such an arrangement allows for the suppression of excessive deformation at the two width directional ends of the tread ring 18, thereby allowing for the suppression of uneven wear and rolling resistance (RR) degradation in the tread ring 18. The tread ring 18 includes a rubber material constituted by a synthetic rubber, a natural rubber, or a mixture thereof, and carbon (C) or silicon dioxide ($SiO_2$) added to the rubber material as a reinforcing agent.

The outer circumferential surface 18b of the tread ring 18, i.e., the outermost surface of the tire-wheel assembly 10 with respect to the radial direction, is the surface (contact patch) that directly contacts the road surface 8. In the present embodiment, the tread ring 18 and the protective ring 16 are anchored to each other, for example, via pressure fitting. In other words, the tread ring 18 is mounted to the outer circumferential surface of the protective ring 16 in a state such that force acts in the contracting direction thereof. Such an arrangement causes the protective ring 16 and the tread ring 18 to fit tightly together, allowing the two to transmit force to each other.

In the tire-wheel assembly 10 of the present embodiment, the tube 14 is inflated to a predetermined air pressure and disposed between the wheel 12 and the protective ring 16, thereby causing the tube 14 to be pressed against the wheel 12 and the protective ring 16. As a result, force can be transmitted between the wheel 12 and the protective ring 16 via the tube 14, and the two rotate in tandem.

The tube 14 is inflated with gas (air, nitrogen, or a mixture thereof) to a predetermined pressure, thereby causing a force expanding outward as seen in cross section to act upon the tube 14 and impelling the tube 14 to swell, as illustrated in FIG. 2. The rigid wheel 12 is disposed on the inner diameter side (i.e., to the inside with respect to the radial direction) of the tube 14, and the protective ring 16 is disposed on the outer diameter side (i.e., to the outside with respect to the radial direction) thereof, thereby keeping the tube 14 from swelling and causing it to contact both the wheel 12 and the protective ring 16. Because the tube 14 is filled with gas (air, nitrogen, or a mixture thereof) to a predetermined pressure, the tube 14 is pressed against the wheel 12 and the protective ring 16 at a predetermined pressure. Such an arrangement causes frictional forces and the like to be generated between the tube 14 and the wheel 12 and protective ring 16 when the wheel 12 or the protective ring 16 rotates. As a result, the tire-wheel assembly 10 allows for the transmission of force between the wheel 12 and the protective ring 16 via the tube 14.

In the present embodiment, the tread ring 18 is assembled with the protective ring 16 via pressure fitting or the like. As a result, the tread ring 18 and the protective ring 16 move in tandem. In other words, when the protective ring 16 or the tread ring 18 rotates, frictional force or the like is generated between the protective ring 16 and the tread ring 18, thereby transmitting rotational-direction force to the non-rotating member of the pair so that the two do not shift in position in relation to each other. As a result, the tire-wheel assembly 10 allows for the transmission of force between the protective ring 16 and the tread ring 18, thereby causing the two to rotate as an integrated whole.

By virtue of the arrangement described above, the tire-wheel assembly 10 is supported by force at least sufficient for the wheel 12, the tube 14, the protective ring 16, and the tread ring 18 to rotate in tandem at the locations of contact therebetween, and therefore rotates as an integrated whole.

The tire-wheel assembly 10 generates repulsive force when the tube 14 is compressed and deformed in the radial direction of the tire-wheel assembly 10 (i.e., the direction indicated by arrow a in FIG. 1). As a result, the tube 14 is capable of supporting loads acting upon the tire-wheel assembly 10. In addition, the tube 14 exhibits elastic deformation, thereby absorbing shocks to the tire-wheel assembly 10. In other words, the tube 14 functions as a vertical spring in the tire-wheel assembly 10. As a result, the tube 14 deforms and dampens vibration and the like when force is placed upon the tire-wheel assembly 10 due to vibration or uneven sections in the road surface when driving. The tube 14 preferably has a spring constant in the compression direction sufficient for the tube 14 to act as a vertical spring of the tire-wheel assembly 10.

Because the protective ring 16 of the tire-wheel assembly 10 is a rigid member, it exhibits substantially no deformation even when the tube 14 deforms, and is capable of maintaining an annular shape. As a result, the tire-wheel assembly 10 is capable of promoting eccentric deformation on the outer circumferential side of the protective ring 16, i.e., the outer circumferential side of the tire-wheel assembly 10. Specifically, there is substantially no repetitive deformation in the shape of the outer circumferential side of the protective ring 16 of the tire-wheel assembly 10 due to bending and compression caused by rotation in contact with the ground (i.e., in the directions indicated by the arrows β in FIG. 1) as seen in the Z-X plane. For this reason, the tire-wheel assembly 10 is capable of suppressing energy loss caused by repetitive deformation of the tread ring 18 in the form of bending and compression. As a result, rolling resistance can be suppressed. Note that the tube 14 deforms and shifts the relative positions of the wheel 12 and the protective ring 16, and deforms in the Z direction, thereby damping forces applied in the Z-axis direction.

A conventional pneumatic tire is made of a composite of rubber and fibrous materials, such as the carcass and belts, and thus exhibits low rigidity in the meridian cross section. Meanwhile, the tire-wheel assembly 10 has a skeleton constituted by the protective ring 16, a cylindrical structural member made of a metal material or fiber reinforced plastic, and the tread ring 18 is supported by the protective ring 16. The protective ring 16 is an annular structural member constituted by strip-shaped members linked together in the circumferential direction, and exhibits high rigidity in the meridian cross section in terms of shape. For this reason, the tire-wheel assembly 10 has greater rigidity in the meridian cross section than does a conventional pneumatic tire. Similarly, the high rigidity of the protective ring 16 in the meridian cross section allows the protective ring 16 to maintain high precision in the shape of its outer circumference as seen in meridian cross section. Thus, the tire-wheel assembly 10 more readily maintains a predetermined shape in its ground contact surface (i.e., the shape of the region between the arrows β) compared to a conventional pneumatic tire. In this way, bending and compression deformation of the tread ring 18 constituting the ground contact patch can be suppressed, allowing for reduced rolling resistance.

The protective ring 16 is made of metal or fiber reinforced plastic, allowing for a greater variety of shapes than that possible for a material constituted by a combination with a fibrous material. For this reason, the tire-wheel assembly 10 can be comparatively easily adjusted to a desired ground contact shape by altering the meridian cross-sectional shape of the outer circumferential surface 16*b* of the protective ring 16. As a result, for example, the ground contact pressure distribution of the tire-wheel assembly 10 can be made uniform over the width direction, or the ground contact length (i.e., the length of the ground contact surface in the circumferential direction) can be increased to adjust turning performance.

The protective ring 16 of the tire-wheel assembly 10 is disposed on the outer side of the tube 14 with respect to the radial direction, and the tread ring 18, which contacts the road surface 8, is attached to the outer side of the protective ring 16 with respect to the radial direction. Thus, even if the tread ring 18 is damaged, the effects of the damage to the tread ring 18 are checked by the protective ring 16. As a result, the tube 14, which is disposed to the inside of the protective ring 16 with respect to the radial direction, is substantially unaffected by the damage, thereby yielding superior traveling properties. In other words, the protective ring 16 of the tire-wheel assembly 10 protects the air-filled tube 14, making it possible to prevent holes from being formed in the tube 14 even if the tire travels over a sharp object such as a nail or broken glass. This helps keep the tire-wheel assembly 10 from entering a flat state.

The tread ring 18 of the tire-wheel assembly 10 need only at least have a section equivalent to the tread cap of a conventional pneumatic tire. As a result, the tire-wheel assembly 10 can be produced using less rubber than a conventional pneumatic tire. This allows the rolling resistance of the tire-wheel assembly 10 to be reduced.

When the tread ring 18 of the tire-wheel assembly 10 becomes worn, it is possible to replace only the tread ring 18. That is, the tread ring 18 can be removed from the protective ring 16, and a new tread ring 18 mounted thereupon. As a result, it is possible to reduce the number of parts that need to be replaced in the tire-wheel assembly 10 compared to a pneumatic tire, thereby reducing the burden upon the environment. In addition, because it is possible to replace only the tread ring 18 of the tire-wheel assembly 10, the replacement tread ring 18 can have a different tread pattern or be of a different compound while the protective ring 16 is left unchanged. In other words, it is sufficient to keep only replacement tread rings at hand, thus allowing the space needed to store replacement parts to be reduced. For example, summer and winter tires can be changed out simply by replacing the tread rings.

Even if the tube 14 is punctured, the tire-wheel assembly 10 can be used again simply by replacing the tube. Thus, it is easier to respond to a flat tire than in the case of pneumatic tires or run flat tires (which are capable of traveling for a specific distance even when punctured), which require everything besides the wheel to be replaced. In addition, the reduction in replaced parts allows replacement costs to be reduced.

A wheel for a pneumatic tire can be used as the wheel of the tire-wheel assembly 10. This allows the tire-wheel assembly 10 according to the present embodiment to be mounted in a similar manner as that of when replacing an existing pneumatic tire.

There is no particular limitation upon the material of the tube 14, but rubber, resin, or the like is preferably the primary material. In general, the elastic modulus of polymeric materials is not more than tenths that of the metal material or fiber reinforced plastic forming the wheel 12 and protective ring 16. As a result, the tube 14 deforms when sandwiched between the wheel 12 and the protective ring 16, thereby absorbing and damping shocks to the tire-wheel assembly 10. As a result, the tire-wheel assembly 10 is capable of ensuring sufficient riding comfort.

The spring constant of the tube 14 of the tire-wheel assembly 10 with respect to the radial direction of the tire-wheel assembly 10 (i.e., the spring constant in the compression direction) can be altered by adjusting the pressure of the gas filling the tube 14. As a result, the vertical rigidity of the tire-wheel assembly 10 can be altered. In this way, the use of the tube 14 yields the advantage of being able to easily alter the vertical rigidity of the tire-wheel assembly 10. In addition, the tube 14 can be adapted for spring properties and gas retention performance, thereby comparatively facilitating the design of the tire-wheel assembly 10. The pressure of the gas filling the tube 14 can also be adjusted in order to adjust the magnitude of the frictional forces and the like generated between the tube 14 and wheel 12 and the protective ring 16, thereby adjusting the tightness of the fit therebetween.

In the present embodiment, the tube 14 is preferably provided with a valve used to fill the interior space 14c with gas, or discharge the gas within. The valve may be directly provided in the tube 14, or may be inserted into a through-hole in the wheel 12. In the latter case, a passage connecting the through-hole in the wheel 12 and the tube 14 is formed in the wheel. The valve is not limited to being disposed as described above. Such an arrangement allows the pressure of the gas filling the tube 14 to be adjusted via the valve with the tube 14 being disposed between the wheel 12 and the protective ring 16. Maintenance, inspection, gas replenishment, and adjustment of the vertical rigidity of the tire-wheel assembly 10 are thereby facilitated.

Figure 4:
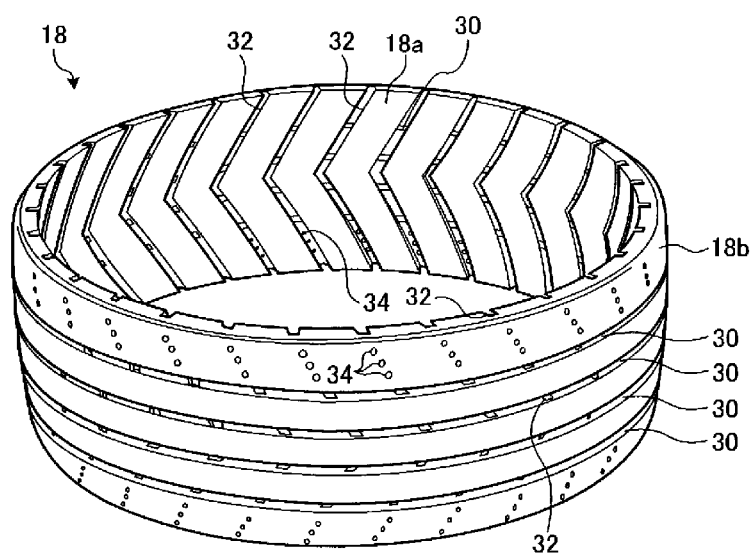
FIG. 4 is a perspective view of the schematic configuration of a tread ring.
Figure 5:
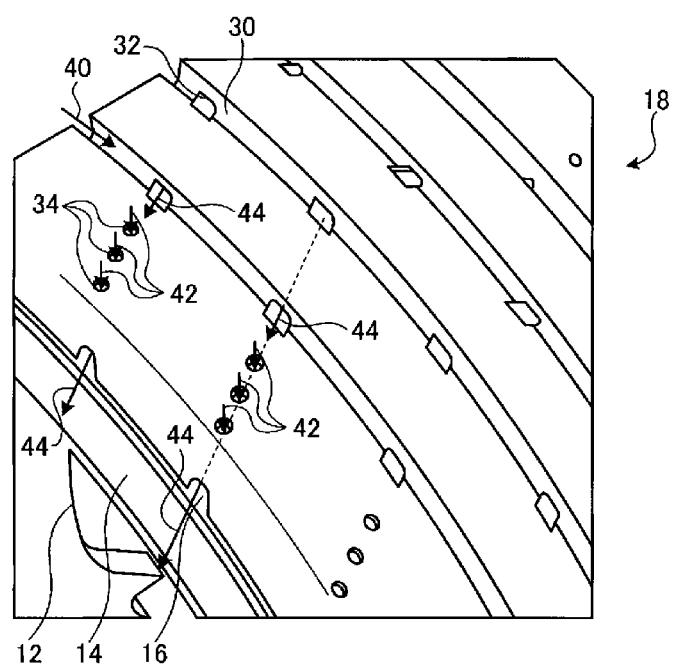
FIG. 5 is a magnified perspective view of the schematic configuration of a tread ring.

Next, the surface shape (tread pattern) of the tread ring 18 will be described with reference to FIGS. 4 and 5. FIG. 4 is a perspective view of the schematic configuration of a tread ring. FIG. 5 is a magnified perspective view of the schematic configuration of a tread ring. Outer circumferential surface grooves 30 are formed in the outer circumferential surface 18b of the tread ring 18. The outer circumferential surface grooves 30 have cross-sectional shapes that are recessed inward with respect to the radial direction, and are constituted by a plurality of circumferential grooves that extend in the circumferential direction. A plurality of outer circumferential surface grooves 30 are formed over the width direction. The outer circumferential surface 18b of the tread ring 18 is defined by the plurality of outer circumferential surface grooves 30, and comprises a plurality of land portions extending in the circumferential direction. The outer circumferential surface 18b of the tread ring 18 may be provided with lug grooves that intersect circumferential grooves as outer circumferential surface grooves 30, as in the case of a pneumatic tire. The outer circumferential surface 18b of the tread ring 18 may also be provided with sipes as outer circumferential surface grooves 30, as in the case of a pneumatic tire.

Next, inner circumferential surface grooves 32 are formed on the inner circumferential surface 18a of the tread ring 18. The inner circumferential surface grooves 32 have cross-sectional shapes that are recessed toward the outside in the radial direction, and extend in the width direction. A plurality of inner circumferential surface grooves 32 is disposed at predetermined intervals in the circumferential direction. The sections of the inner circumferential surface grooves 32 that overlap the outer circumferential surface grooves 30 are connected to the outer circumferential surface grooves 30. As a result, the inner circumferential surface grooves 32 and the outer circumferential surface grooves 30 are connected to each other. The inner circumferential surface grooves 32 are grooves that extend from one end to another in the width direction, and form letter-V shapes the crests of which are located in the center in the width direction and point one way in the circumferential direction. There is no particular limitation upon the shape of the inner circumferential surface grooves 32, but the grooves preferably extend in the width direction of the tire. It is preferable that at least one end of the inner circumferential surface grooves 32 extend to an end in the width direction, and more preferable that both ends extend to ends in the width direction. In other words, it is preferable that at least one end of the inner circumferential surface grooves 32 be exposed on the side surface.

Next, through-holes 34 that extend from the outer circumferential surface 18b to the inner circumferential surface 18a, i.e., penetrate in the radial direction, are formed in the tread ring 18. The through-holes 34 are formed at positions at which the inner circumferential surface grooves 32 are formed. In other words, the ends of the through-holes 34 closer to the inner circumferential surface 18a connect with the inner circumferential surface grooves 32.

As described above, inner circumferential surface grooves 32 can be provided in the inner circumferential surface 18a constituting the inner surface with respect to the radial direction of the tread ring 18 of the tire-wheel assembly 10 of the present embodiment, and through-holes 34 penetrating from the outer circumferential surface 18b to the inner circumferential surface 18a are provided therein. As a result, water flows in the outer circumferential surface grooves 30 of the tread ring 18 as indicated by arrow 40 when the tire is traveling, for example, on a wet road surface. Water also flows into the through-holes 34 as indicates by arrows 42. As indicated by the arrows 40, 42, some of the water flowing into the outer circumferential surface grooves 30 and the through-holes 34 flows into the inner circumferential surface grooves 32 connected to the outer circumferential surface grooves 30 and the through-holes 34. Water flowing into the inner circumferential surface grooves 32 is directed outward in the width direction along the inner circumferential surface grooves 32, as indicated by arrows 44, and is discharged out of the width directional ends of the tread ring 18. In this way, the inner circumferential surface grooves 32 of the tread ring 18, as well as the combination of the inner circumferential surface grooves 32 and the through-holes 34, are capable of functioning in a manner similar to the lug grooves of a pneumatic tire. In addition, because the inner circumferential surface 18a of the tread ring 18 is supported by the rigid protective ring 16, the shape of the inner circumferential surface grooves 32 in the inner circumferential surface 18a can be maintained. Moreover, because the formation of grooves in the inner circumferential surface 18a does not affect the tube 14, the interior of the tube 14 can be kept filled with air.

By virtue of the arrangement described above, the tread ring 18 is capable of yielding the same performance yielded by the tread pattern of a pneumatic tire using the outer circumferential surface grooves 30, as well as the inner circumferential surface grooves 32 and the through-holes 34, which could not be formed in a conventional pneumatic tire as this would allow the gas (air, etc.) in the interior thereof to escape. This allows for greater freedom in the design of the tread pattern, allowing for a higher-performance tread pattern. For example, the number of grooves formed in the outer circumferential surface 18b of the tread ring 18 constituting the ground contact surface can be reduced, with water entering the grooves being ejected by the inner circumferential surface grooves 32. This allows for increased block rigidity and better water discharge performance. In other words, a high-level balance can be struck between wet and dry performance.

In addition, because the tread ring 18 is at least provided with a section equivalent to a tread cap, as described above, thereby eliminating the need for a section equivalent to the sidewalls of a pneumatic tire, the tread ring 18 can have a cylindrical shape. Thus, molds can be used to form grooves in both the inner circumferential surface 18a and the outer circumferential surface 18b of the tread ring 18. As a result, a tread ring with grooves formed in the inner circumferential surface and outer circumferential surface thereof can be manufactured comparatively simply.

In the present embodiment, the tread ring 18 was mounted on the protective ring 16 via pressure fitting, but there is no particular limitation upon the method used to anchor the tread ring 18 to the protective ring 16. For example, the tread ring 18 may be bonded to the protective ring 16 using an adhesive. When replacing a tread ring 18 that has been bonded on using adhesive, the tread ring 18 can be recovered along with the protective ring 16 and the tread ring 18 removed to allow the protective ring 16 to be reused. In addition, it is easy to remove the tread ring 18 of the recovered tread ring 18 attached protective ring 16 and attach a new tread ring 18 to the protective ring 16 (i.e., retreading). There is no particular limitation upon the adhesive used on the tread ring 18 and the protective ring 16; a stimuli-responsive adhesive (such as an adhesive that reversibly reacts in response to stimuli such as heat or electricity) can be used. It is thus possible to facilitate the assembly and disassembly of the protective ring 16 and the tread ring 18.

The tread ring 18 is imparted with a ring shape (cylindrical shape) by being mounted upon the protective ring 16, but need not have a ring shape prior to being mounted. For example, the tread ring 18 may be manufactured in a sheet-like shape, then wrapped around the protective ring 16 to impart the sheet-shaped member with a ring shape. In this case, the tread ring 18 can be mounted by being anchored to the protective ring 16 using an adhesive, MAGICTAPE™, or the like. Easy attachment and release can be obtained by using MAGICTAPE™ as the means of anchoring the tread ring 18 to the protective ring 16. Producing the tread ring in a sheet-like form allows grooves to be more easily machined in the outer circumferential surface and the inner circumferential surface. Production in this manner also allows for easier mounting.

The tube of the tire-wheel assembly 10 of the present embodiment is also replaceable. This allows the tube to be changed out according to desired functionality, for example. The color of the tube can also be changed according to user taste. The color of the tube can be altered according to functionality to allow the functionality of the tube currently being used in the tire-wheel assembly 10 to be determined by checking the color thereof.

The wheel 12 and the protective ring 16 of the tire-wheel assembly 10 of the present embodiment are spaced a predetermined distance from each other in the radial direction, thereby allowing for relative movement on the part of the wheel 12 and the protective ring 16, and enabling the tube 14 to deform in the radial and width directions between the wheel 12 and the protective ring 16. The tube 14 is thus capable of damping forces acting on the tire-wheel assembly 10 in the Z direction and the like.

In the tire-wheel assembly 10 according to the present embodiment, the outer circumferential surface 12a of the wheel 12 is formed as a curved surface that increases in diameter toward the width directional ends as seen in meridian cross section, thus making it possible to keep the tube 14 from coming off the wheel 12. In addition, the inner circumferential surface 16a of the protective ring 16 of the tire-wheel assembly 10 is formed as a curved surface that decreases in diameter toward the width-directional ends as seen in cross section, thus making it possible to keep the tube 14 from coming off the protective ring 16.

Other Embodiments

Figure 6:
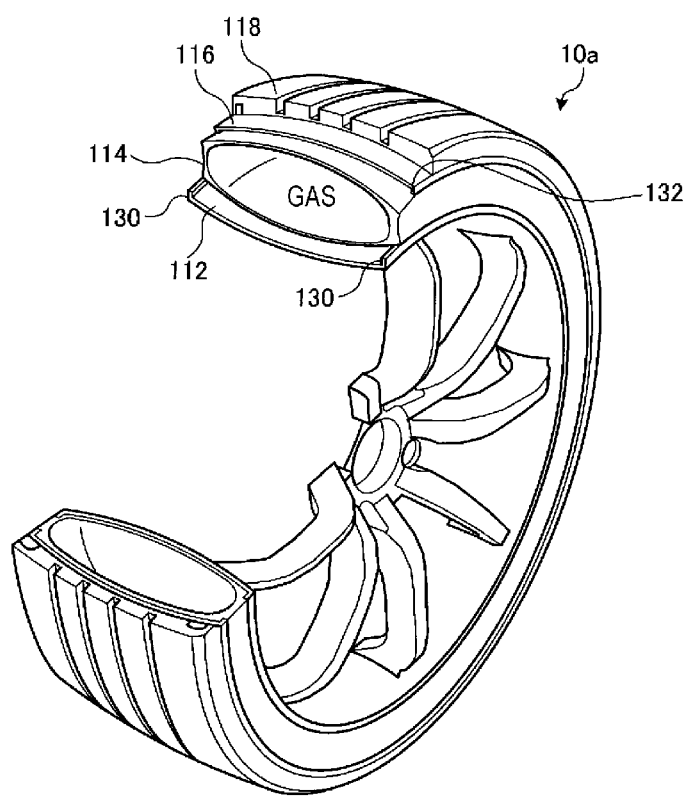
FIG. 6 is a perspective view of the schematic configuration of an example of a tire-wheel assembly according to another embodiment.
Figure 7:
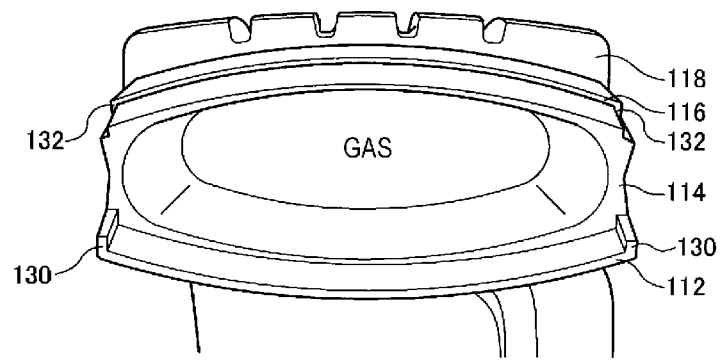
FIG. 7 is a cross-sectional view of a tire-wheel assembly according to another embodiment.
Figure 8:
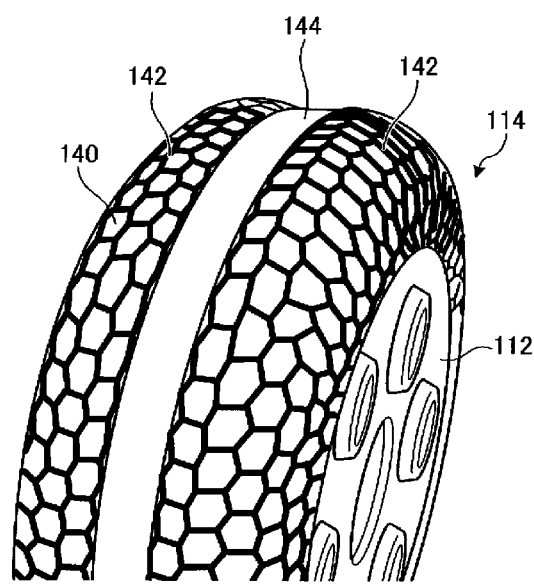
FIG. 8 is a perspective view of the schematic configuration of another example of a tube.

FIG. 6 is a perspective view of the schematic configuration of an example of a tire-wheel assembly according to another embodiment. FIG. 7 is a cross-sectional view of a tire-wheel assembly according to another embodiment. FIG. 8 is a perspective view of the schematic configuration of another example of a tube. A tire-wheel assembly 10a according to the other embodiment comprises a wheel 112, a tube 114, a protective ring 116, and a tread ring 118.

Projections 130 that project outward in the radial direction are provided at both ends in the width direction on the outer circumferential surface of the wheel 112. Providing the wheel 112 with the projections 130 allows the tube 114 contacting the outer circumferential surface thereof to be more stably held. Projections 132 that project inward in the radial direction are provided at both ends in the width direction on the inner circumferential surface of the protective ring 116. Providing the protective ring 116 with the projections 132 allows the tube 114 contacting the inner circumferential surface thereof to be more stably held. Providing the tire-wheel assembly 10a with the projections 130, 132 in this way allows the distance (i.e., radial directional distance) between the wheel 112 and the protective ring 116 at both outer ends in the width direction to be reduced compared to the interior section with respect to the width direction. This arrangement allows for a state that helps prevent the tube 114 from slipping out from between the wheel 112 and the protective ring 116 at the width directional ends, allowing the tube 114 to be more stably held.

Next, fibers 142 are disposed within rubber 140 of the tube 114 to provide a skeleton, as illustrated in FIG. 8. In other words, the tube 114 has a hollow ring shape obtained by coating the fibers 142 with the rubber 140. The fibers 142 are formed from a material of greater strength than the rubber 140. A reinforcing member 144 is disposed on the outer circumferential surface of the tube 114 in the center in the width direction along a ring in the circumferential direction. The reinforcing member 144 is a ring having a smaller diameter than the rubber 140. The reinforcing member 144 is formed from a material of greater strength than the rubber 140.

By reinforcing the tube 114 of the tire-wheel assembly 10a with the fibers 142, the durability of the tube can be improved, and excessive deformation in only parts of the tube 114 can be suppressed. It is thereby possible to prevent herniations in which the tube 114 excessively protrudes from between the wheel 112 and the protective ring 116 and is incapable of returning to its original state. The fibers 142 are preferably provided along the entire surface as seen in cross section, but may be provided in only a section thereof. The fibers 142 are preferably disposed so as to be at least capable of regulating deformation of the tube 114 in the width direction. Reinforcing the tube 114 of the tire-wheel assembly 10a with the fibers 142 and further providing the reinforcing member 144 allows the tube 114 to maintain a constant shape even if punctured, thereby allowing for the suppression of excessive deflation. As a result, the tube 114 is capable of maintaining the spacing between the wheel 112 and the protective ring 116 even if punctured, thereby allowing for continued driving.

Figure 9:
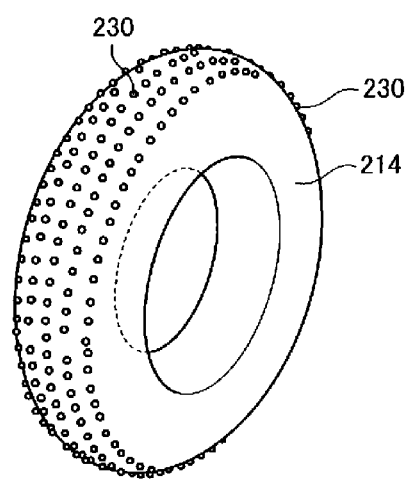
FIG. 9 is a perspective view of the schematic configuration of another example of a tube.

FIG. 9 is a perspective view of the schematic configuration of another example of a tube. A plurality of projections 230 are provided on the surface of the tube 214 illustrated in FIG. 9. The projections 230 are provided on the surfaces that contact the wheel and protective ring constituting the objects of contact by the tube 214, and contact the outer circumferential surface of the wheel and the inner circumferential surface of the protective ring. The projections 230 are anchors that support the tube 214 so as to keep it from moving with respect to the wheel and the protective ring. In other words, the projections 230 project further outward than the other parts, thereby allowing for stronger contact with the wheel and the protective ring. This inhibits shifting of the relative positions, and functions as an anchor.

The tube of the tire-wheel assembly may be divided into a plurality of tube divisions. By using a plurality of divided tube divisions in the tire-wheel assembly, the wheel and the protective ring can be held by the other tube divisions even if one tube division is punctured. As a result, continued driving is possible even if a puncture occurs, allowing for greater resistance to punctures and improved safety. In addition, if a puncture does occur, the punctured tube division can be replaced to restore the original condition. This arrangement facilitates replacement, and allows the number of replaced parts to be minimized.

Figure 10:
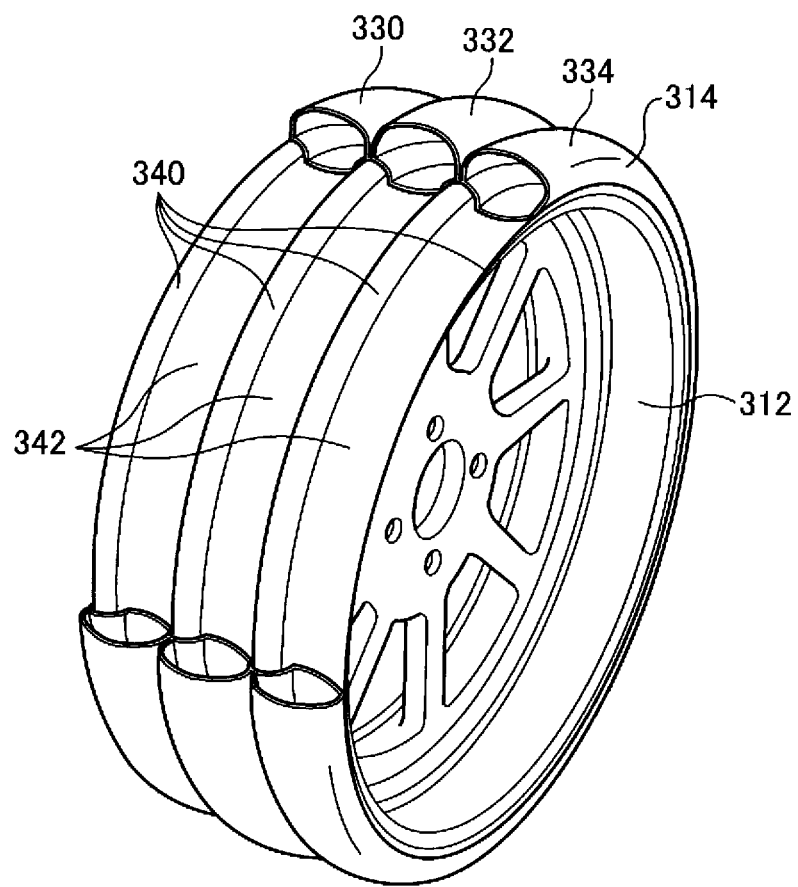
FIG. 10 is a perspective view of the schematic configuration of another example of a tube and a wheel.

FIG. 10 is a perspective view of the schematic configuration of another example of a tube and a wheel. The tube 314 illustrated in FIG. 10 comprises tube divisions 330, 332, 334 obtained by dividing the tube 314 into three sections in the width direction. A wheel 312 is provided with four dividing walls 340 that project outward in the radial direction and extend in the circumferential direction in correspondence to the tube divisions 330, 332, 334, thereby dividing the width direction into three chambers 342. The tube divisions 330, 332, 334 are disposed in the three chambers 342. Because the tube 314 is divided into the tube divisions 330, 332, 334 as illustrated in FIG. 10, the other tubes remain intact even if one tube is punctured, thereby allowing for continued driving. In the example illustrated in FIG. 10, the tube 314 is divided in the width direction into tube divisions 330, 332, 334, with the result that two of the tube divisions 330, 332, 334 remain filled with air along their entire lengths in the circumferential direction even if one of the tube divisions is punctured. This arrangement allows more stable driving to be maintained.

Figure 11:
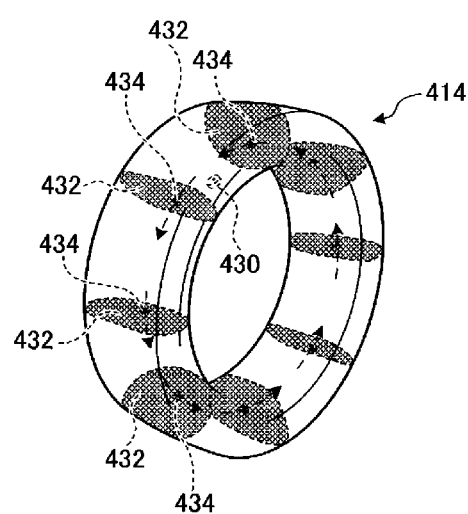
FIG. 11 is a perspective view of the schematic configuration of another example of a tube.

FIG. 11 is a perspective view of the schematic configuration of another example of a tube. The tube 414 illustrated in FIG. 11 is provided with a valve 430 for feeding air into the tube 414. The tube 414 is divided into multiple sections by a plurality of dividing walls 432 disposed at various positions in the circumferential direction. Each of the dividing walls 432 is provided with a check valve 434, thereby allowing air to flow through the dividing walls 432 from one interior space to another adjacent interior space, the interior spaces being from among those of the tube 414 divided by the dividing walls 432.

The tube 414 is divided into a plurality of interior spaces by the dividing walls 432, thereby allowing each space to serve as a tube division. In addition, the provision of the check valves 434 to allow for unidirectional air flow allows air fed through one valve 430 to be supplied to all of the interior spaces. It is thus possible to feed air into all of the tube divisions using a single valve 430. The use of the check valves 434 to allow for the flow of air allows the balance of air to be automatically balanced. In addition, because a plurality of dividing walls 432 and check valves 434 are provided, thereby dividing the tube 414 into a plurality of air chambers, in the event that one of the tube divisions is punctured, the speed of the flow of air into the punctured tube division from the other unpunctured tube divisions can be suppressed, thereby allowing the speed of reduction in the air pressure of the tube 414 as a whole to be suppressed. It is thereby possible to suppress sudden reductions in air pressure when punctures occur, allowing for improved safety in the event of a puncture.

Figure 12:
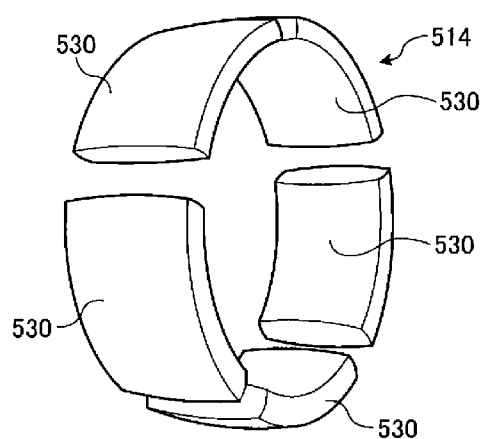
FIG. 12 is a perspective view of the schematic configuration of another example of a tube.

FIG. 12 is a perspective view of the schematic configuration of another example of a tube. The tube 514 illustrated in FIG. 12 comprises a plurality of divided tube divisions 530 disposed in the circumferential direction. In other words, the tube 514 is divided in the circumferential direction into a plurality of tube divisions 530. A single tube division 530 is disposed in only a partial region in the circumferential direction. As illustrated in FIG. 12, the division of the tube 514 into multiple sections in the circumferential direction allows the effects upon the other tube divisions 530 in the event that one of the tube divisions 530 is punctured to be reduced. Because the rest of the tube remains intact even if one section of the tube is punctured in this arrangement, continued driving is possible.

The tread ring 18 according to the embodiment described above can be provided with outer circumferential surface grooves 30 formed in the outer circumferential surface 18*b*, inner circumferential surface grooves 32 formed in the inner circumferential surface 18*a*, and through-holes 34 penetrating from the outer circumferential surface 18*b* to the inner circumferential surface 18*a* to further improve tire performance as described above, but is not limited thereto. Various patterns can be used for the tread pattern (groove pattern) formed in the tread ring.

Figure 13:
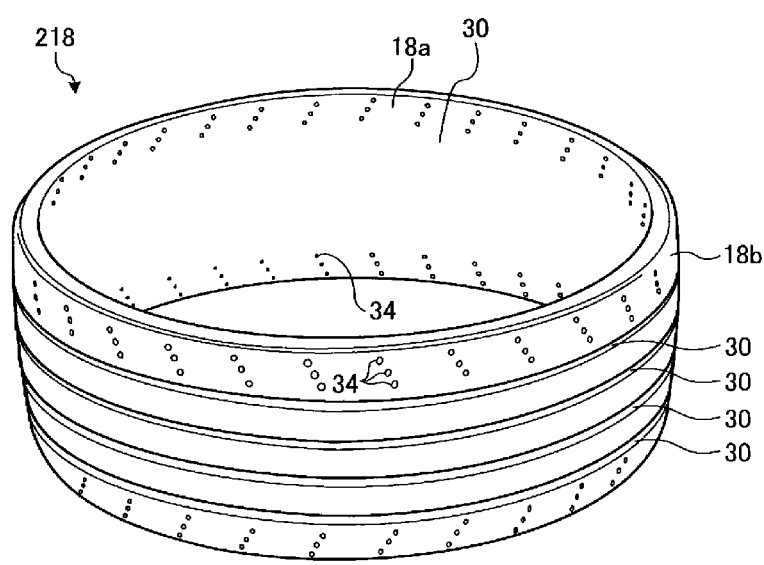
FIG. 13 is a magnified perspective view of the schematic configuration of another example of a tread ring.

FIG. 13 is a magnified perspective view of the schematic configuration of another example of a tread ring. Outer circumferential surface grooves 30 are formed in the outer circumferential surface 18*b* of the tread ring 218 illustrated in FIG. 13. Through-holes 34 penetrating from the outer circumferential surface 18*b* to the inner circumferential surface 18*a* are also formed in the tread ring 218. A tread ring in which inner circumferential surface grooves 32 are not formed, as in the case of the tread ring 218, may also be used in the tire-wheel assembly. The tread ring may have a pattern in which through-holes 34 are not provided. In order to further improve wet performance, the inner circumferential surface grooves 32 in the tread ring are preferably connected to the outer circumferential surface grooves 30 and the through-holes 34, but a pattern in which the inner circumferential surface grooves 32 are connected to only one of these two, or to neither, is also possible. The tread ring may also have a pattern in which outer circumferential surface grooves 30 are not provided.

In the tire-wheel assembly according to the embodiments described above, the tube and the wheel are in contact and the tube and the protective ring are in contact, but the present technology is not limited to such an arrangement. That is, the present technology is not limited to a structure in which the inner circumferential surface of the tube contacts the outer circumferential surface of the wheel and the outer circumferential surface of the tube contacts the inner circumferential surface of the protective ring.

Figure 14:
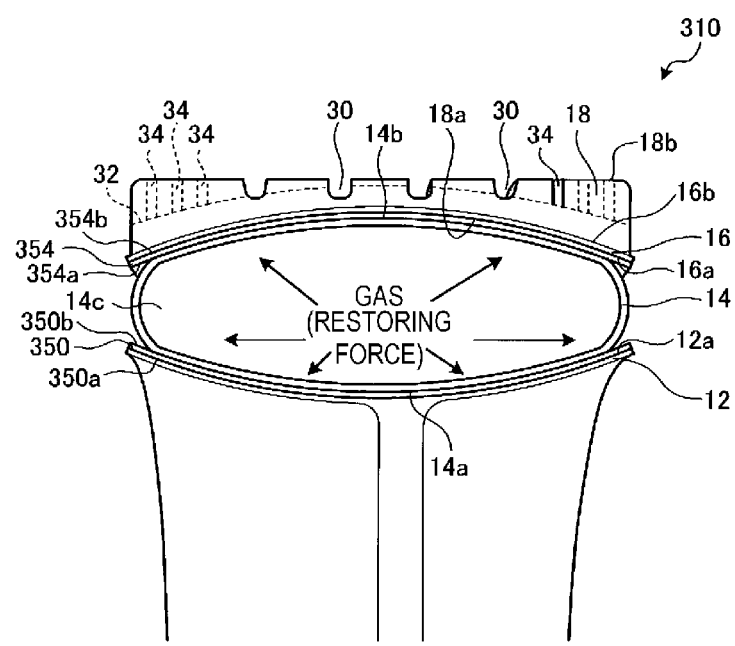
FIG. 14 is a cross-sectional view of the schematic configuration of an example of a tire-wheel assembly according to another embodiment.
Figure 15:
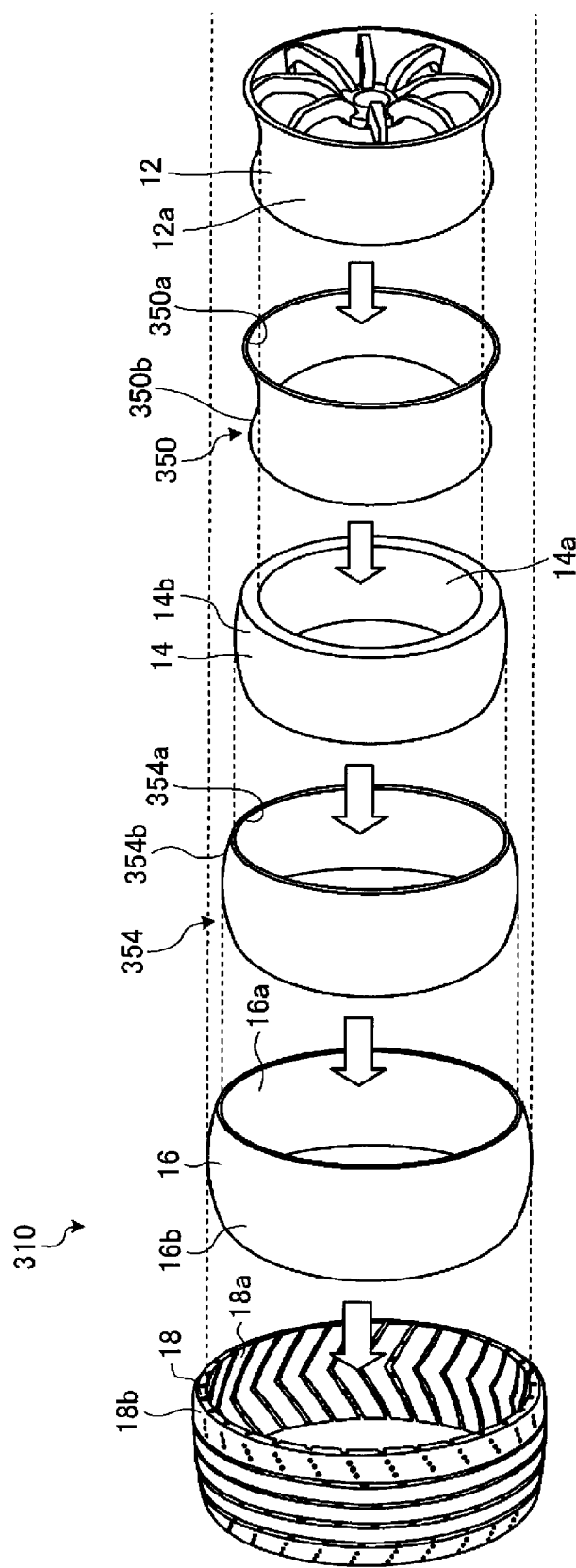
FIG. 15 is an exploded perspective view of the tire-wheel assembly illustrated in FIG. 14.

FIG. 14 is a cross-sectional view of the schematic configuration of an example of a tire-wheel assembly according to another embodiment. FIG. 15 is an exploded perspective view of the tire-wheel assembly illustrated in FIG. 14. The tire-wheel assembly 310 illustrated in FIGS. 14 and 15 comprises the wheel 12, the tube 14, the protective ring 16, the tread ring 18, an inner circumference supporting section 350, and an outer circumference supporting section 354. The wheel 12, the tube 14, the protective ring 16, and the tread ring 18 are configured as in the tire-wheel assembly 10; thus, description thereof will be omitted.

The inner circumference supporting section 350 has a ring-like shape, with an inner circumferential surface 350a thereof contacting the outer circumferential surface 12a of the wheel 12, and an outer circumferential surface 350b thereof contacting the inner circumferential surface 14a of the tube 14. The inner circumference supporting section 350 is formed from an elastic material having a high friction factor, such as rubber. The inner circumference supporting section 350 contacts both the wheel 12 and the tube 14, and holds the tube 14 against the wheel 12.

The outer circumference supporting section 354 has a ring-like shape, with an inner circumferential surface 354a thereof contacting the outer circumferential surface 14a of the tube 14, and an outer circumferential surface 354b thereof contacting the inner circumferential surface 16a of the protective ring 16. The outer circumference supporting section 354 is formed from an elastic material having a high friction factor, such as rubber. The outer circumference supporting section 354 contacts both the tube 14 and the protective ring 16, and holds the tube 14 against the protective ring 16.

Providing the tire-wheel assembly 310 with the inner circumference supporting section 350 suppresses shifting of the tube 14 with respect to the wheel 12, and allows damage to the tube 14 caused by the wheel 12 to be suppressed. Providing the tire-wheel assembly 310 with the outer circumference supporting section 354 suppresses shifting of the tube 14 with respect to the protective ring 16, and allows damage to the protective ring 16 caused by the wheel 12 to be suppressed.

The inner circumference supporting section 350 may be anchored to the wheel 12. The outer circumference supporting section 354 may be anchored to the protective ring 16. Various anchoring methods can be used, such as bonding using an adhesive or the like. Anchoring the inner circumference supporting section 350 to the wheel 12 or the outer circumference supporting section 354 to the protective ring 16 allows shifting of the two to be suppressed, and more reliably suppresses shifting of the tube 14 with respect to the wheel 12 or the protective ring 16. The inner circumference supporting section 350 or the outer circumference supporting section 354 is preferably disposed along the entirety of the wheel 12 or the protective ring 16 in the width direction, but may be provided along at least a section thereof. The inner circumference supporting section 350 or outer circumference supporting section 354 is preferably provided along the entirety of the section of the wheel 12 or protective ring 16 that contacts the tube 14. The inner circumference supporting section 350 or outer circumference supporting section 354 may be divided into multiple sections in the width direction of the tire. The inner circumference supporting section 350 or outer circumference supporting section 354 is not limited to having a ring-like shape, and may be provided in separate sections in the circumferential direction of the wheel 12 or protective ring 16. In other words, the inner circumference supporting section 350 or outer circumference supporting section 354 may be bonded to only a section of the surface of the wheel 12 or protective ring 16 in the circumferential direction. The tire-wheel assembly may be optionally provided with only one of the inner circumference supporting section 350 or the outer circumference supporting section 354.

Figure 16:
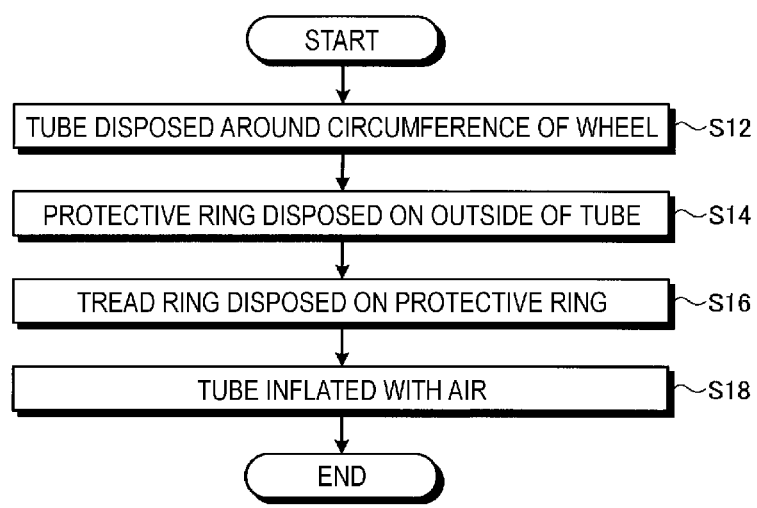
FIG. 16 is a flow chart of an example of a method of assembling a tire-wheel assembly.

Next, a method of assembling (manufacturing) the tire-wheel assembly will be described with reference to FIG. 16. FIG. 16 is a flow chart of an example of a method of assembling a tire-wheel assembly. The wheel 12, tube 14, protective ring 16, and tread ring 18 are manufactured separately.

First, in step S12, the tube 14 is disposed around the circumference of the wheel 12. At this point, the tube 14 is not yet inflated with air, and can easily deform. Next, in step S14, the protective ring 16 is disposed to the outside of the tube 14. Because the tube 14 is not yet inflated with air at this point, it can easily be disposed to the inside of the protective ring 16.

Next, in step S16, the tread ring 18 is disposed on the protective ring 16. The tread ring 18 is, for example, pressured fitted to the protective ring 16. Subsequently, in step S18, the tube 14 is inflated with air. This imparts the interior of the tube 14 with a predetermined pressure, thereby causing the tube 14 to fit tightly to the wheel 12 and the protective ring 16. The tire-wheel assembly is assembled according to the steps described above.

Step S16 illustrated in FIG. 16 may be performed before step S14, and the order of steps S12 and S14 may be reversed. When an inner circumference supporting section is provided, the inner circumference supporting section is first mounted on the wheel, after which the tube is disposed on the outer circumference of the inner circumference supporting section. Alternatively, the inner circumference supporting section and the tube may first be joined together, then mounted on the wheel. When an outer circumference supporting section is provided, the outer circumference supporting section is first mounted on the protective ring, after which the protective ring is disposed on the outside of the tube. Alternatively, the outer circumference supporting section and the tube may first be joined together, then incorporated into the assembly.

Because no carcass or belt layers are present in the tire-wheel assembly 10, the tire-wheel assembly 10 can be manufactured more easily than a conventional pneumatic tire. Specifically, the tire-wheel assembly 10 can be completed by attaching the ring-shaped tread ring 18 to the protective ring 16, and using the tube 14 to assemble the protective ring 16 onto the wheel 12. As a result, the manufacturing process used to manufacture (assemble) the tire-wheel assembly 10 can be extensively automated compared to the case of a conventional pneumatic tire. The tube 14, wheel 12, and protective ring 16 of the tire-wheel assembly 10 can be taken apart by releasing the air from the tube 14. This allows for easy replacement of the various parts. In addition, the tread ring 18 can easily be attached to and removed from the protective ring 16. Moreover, while a conventional pneumatic tire requires specialized equipment to replace the tire, the tire-wheel assembly according to the present embodiment requires no special replacement equipment, nor is any special skill required to replace the tire. Thus, the tire can easily be replaced even by a non-specialized or untrained worker.

What is claimed is:
1. A tire-wheel assembly comprising:
a wheel coupled to a rotating shaft;
an elastic tube disposed on an outer side of the wheel in a radial direction, an interior of the tube being filled with air;

a rigid protective ring disposed on an outer side of the tube in the radial direction so as to be separated from the wheel; and a tread ring disposed on an outer side of the protective ring in the radial direction, an inner circumferential surface of the tread ring contacting an outer circumferential surface of the protective ring; wherein through-holes that penetrate from the inner circumferential surface to an outer circumferential surface of the tread ring are formed in the tread ring;

inner circumferential surface grooves that are concave with respect to the outer circumferential surface of the tread ring are formed in the inner circumferential surface of the tread ring;

the inner circumferential surface grooves are connected with the through-holes; and the inner circumferential surface grooves extend from one end of the inner circumferential surface to another end of the inner circumferential surface in a width direction of the inner circumferential surface that is parallel to a central axis.

2. The tire-wheel assembly according to claim 1, wherein an inner circumferential surface of the protective ring decreases in diameter progressing outward in a width direction that is parallel to the rotating shaft.

3. The tire-wheel assembly according to claim 1, wherein an outer circumferential surface of the wheel increases in diameter progressing outward in a width direction that is parallel to the rotating shaft.

4. The tire-wheel assembly according to claim 1, wherein a plurality of projections for improving adhesion to the protective ring is formed on an outer circumferential surface of the tube.

5. The tire-wheel assembly according to claim 1, wherein the tube is provided with a shape-regulating structure that regulates deformation in a tire width direction.

6. The tire-wheel assembly according to claim 1, wherein the tube comprises a plurality of divided tube divisions.

7. The tire-wheel assembly according to claim 6, wherein the tube divisions are disposed adjacent to one another in a circumferential direction concurrent with a rotational direction of the rotating shaft.

8. The tire-wheel assembly according to claim 6, wherein the tube divisions are disposed adjacent to one another in a width direction.

9. The tire-wheel assembly according to claim 1, wherein the tube is provided with a dividing wall that divides air-filled interior spaces in the tube.

10. The tire-wheel assembly according to claim 9, wherein a check valve that connects adjacent interior spaces and allows for unidirectional air flow is provided in the dividing wall of the tube.

11. The tire-wheel assembly according to claim 1, wherein the tread ring is removable from the protective ring.

12. The tire-wheel assembly according to claim 1, wherein an inner circumferential surface of the tube contacts an outer circumferential surface of the wheel.

13. The tire-wheel assembly according to claim 1, further comprising an inner circumference supporting section that contacts the wheel and the tube and holds the tube against the wheel.

14. The tire-wheel assembly according to claim 1, wherein an outer circumferential surface of the tube contacts an inner circumferential surface of the protective ring.

15. The tire-wheel assembly according to claim 1, further comprising an outer circumference supporting section that contacts the protective ring and the tube and holds the tube against the protective ring.

16. An annular tread ring formed from an elastic member, and comprising an inner circumferential surface that contacts a ring-shaped rigid member and an outer circumferential surface that contacts ground, the tread ring comprising:

through-holes formed in the tread ring that penetrate from the inner circumferential surface to the outer circumferential surface; wherein inner circumferential surface grooves that are concave with respect to the outer circumferential surface are formed in the inner circumferential surface of the tread ring;

the inner circumferential surface grooves are connected with the through-holes; and the inner circumferential surface grooves extend from one end of the inner circumferential surface to another end of the inner circumferential surface in a width direction of the inner circumferential surface that is parallel to a central axis.

17. The tread ring according to claim 16, wherein inner circumferential surface grooves that are concave with respect to the outer circumferential surface of the tread ring are formed in the inner circumferential surface of the tread ring;

outer circumferential surface grooves that are concave with respect to the inner circumferential surface are formed in the outer circumferential surface of the tread ring; and the outer circumferential surface grooves are connected with the inner circumferential surface grooves.

18. A tire-wheel assembly comprising:

a wheel coupled to a rotating shaft;

an elastic tube disposed on an outer side of the wheel in a radial direction, an interior of the tube being filled with air;

a rigid protective ring disposed on an outer side of the tube in the radial direction so as to be separated from the wheel; and a tread ring disposed on an outer side of the protective ring in the radial direction, an inner circumferential surface of the tread ring contacting an outer circumferential surface of the protective ring;

wherein inner circumferential surface grooves extend from one end of the inner circumferential surface to another end of the inner circumferential surface in a width direction of the inner circumferential surface that is parallel to a central axis.

19. The tire-wheel assembly according to claim 18, wherein the elastic tube forms a part of a side wall of a tire of the tire-wheel assembly and is exposed to an outside of the tire.

20. The tire-wheel assembly according to claim 18, wherein the elastic tube has a cross sectional width in a tire width direction greater than a cross-sectional height in a tire radial direction.

* * * * *